United States Patent
Cai (10) Patent No.: US 7,873,002 B2
(45) Date of Patent: Jan. 18, 2011

(54) FRAME STRUCTURE FOR MULTI-HOP RELAY IN WIRELESS COMMUNICATION SYSTEMS

(75) Inventor: Sean Cai, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 0 days.

(21) Appl. No.: 11/858,118

(22) Filed: Sep. 19, 2007

(65) Prior Publication Data

US 2008/0070582 A1    Mar. 20, 2008

Related U.S. Application Data

(60) Provisional application No. 60/845,950, filed on Sep. 19, 2006.

(51) Int. Cl.
*H04W 4/00* (2009.01)

(52) U.S. Cl. .................. 370/329; 370/315; 370/349; 455/450; 455/464; 455/509; 455/13.1; 455/11.1

(58) Field of Classification Search ................ 455/450, 455/11.1, 13.1, 464, 509; 370/341, 329, 370/315, 349
See application file for complete search history.

(56) References Cited

U.S. PATENT DOCUMENTS

| | | | |
|---|---|---|---|
| 2001/0036810 A1 | 11/2001 | Larsen | |
| 2002/0075941 A1 | 6/2002 | Souissi et al. | |
| 2007/0072604 A1* | 3/2007 | Wang | 455/428 |
| 2007/0086370 A1 | 4/2007 | Jang et al. | |
| 2007/0086374 A1 | 4/2007 | Jang et al. | |
| 2007/0086404 A1 | 4/2007 | Jang et al. | |
| 2007/0086413 A1 | 4/2007 | Jang et al. | |
| 2007/0086414 A1 | 4/2007 | Jang et al. | |
| 2007/0086415 A1 | 4/2007 | Jang et al. | |
| 2007/0086416 A1 | 4/2007 | Jang et al. | |
| 2007/0086417 A1 | 4/2007 | Jang et al. | |
| 2007/0086418 A1 | 4/2007 | Jang et al. | |
| 2007/0086419 A1 | 4/2007 | Jang et al. | |
| 2007/0087724 A1 | 4/2007 | Jang et al. | |
| 2007/0097984 A1 | 5/2007 | Jang et al. | |
| 2007/0115970 A1 | 5/2007 | Jang et al. | |
| 2007/0115971 A1 | 5/2007 | Jang et al. | |
| 2007/0115972 A1 | 5/2007 | Jang et al. | |

(Continued)

FOREIGN PATENT DOCUMENTS

JP    2006-246002    9/2006

(Continued)

OTHER PUBLICATIONS

IEEE802.16j-2007, "IEEE Standard for Local and Metropolitan Area Networks, Part 16: Air Interface for Fixed and Mobile Broadband Wireless Access Systems," Feb. 9, 2007, 58 pages.

(Continued)

*Primary Examiner*—Ajit Patel
*Assistant Examiner*—Khai M Nguyen
(74) *Attorney, Agent, or Firm*—Perkins Coie LLP (57) ABSTRACT

Implementations of systems and techniques for scheduling wireless transmission of data blocks between a base station (BS) and one or more relay stations (RSs) in a wireless relay communication network.

13 Claims, 9 Drawing Sheets

U.S. PATENT DOCUMENTS

| | | | |
|---|---|---|---|
| 2008/0025280 A1* | 1/2008 | Hsu et al. | 370/341 |
| 2008/0267110 A1 | 10/2008 | Cai et al. | |
| 2009/0016290 A1 | 1/2009 | Chion | |

FOREIGN PATENT DOCUMENTS

| | | |
|---|---|---|
| KR | 10-2006/0097693 | 9/2006 |
| WO | WO2008103965 A1 | 8/2008 |
| WO | WO 2009/009511 | 1/2009 |

OTHER PUBLICATIONS

IEEE 802.16-2004, "IEEE Standard for Local and Metropolitan Area Networks, Part 16: Air Interface for Fixed Broadband Wireless Access Systems," Oct. 1, 2004, 895 pages.

IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1," Feb. 18, 2006, 864 pages.

International Search Report and Written Opinion, dated Aug. 29, 2008, from international application PCT/US07/78961, now WO 2008/036784, entitled "Frame Structure for Multi-Hop Relay in Wireless Communication Systems" (9 pages).

Chen, J. et al., "A framework to relieve wireless hot-spot congestion by means of ad hoc connections," The Proceeings of the fifth IFIP-TC6 International Conference on Mobile and Wireless Communication Networks (MWCN '03), Singapore, Oct. 27-29, 2003, pp. 7-10.

English language abstract for Korean Patent No. KR 2006097693, published Sep. 14, 2006, entitled "Method for allocating transmission periods in wireless telecommunication system, capable of efficiently allocating transmission period in transmission frame period of wireless network system," (2 pages).

International Search Report and Written Opinion, dated Jul. 10, 2008, from international application PCT/US2008/054808, entitled "Signaling for Multi-Hop Relay in Wireless Communication Systems," (10 pages).

IEEE 802.16j-06/013, Broadband Wireless Access Working Group, " Multi-hop Relay System Evaluation Methodology (Channel Model and Performance Metric)," Sep. 5, 2006, 38 pages.

"Air Interface for Fixed and Mobile Broadband Wireless Access Systems—Multihop Relay Specification," IEEE 802.16j—06/026r4, (Jun. 6, 2007), 203 pages.

Frediani et al., "Dynamic Resource Allocation in Relay Enhanced Cells based on Winner System," In: Mobile and Wireless Communications Summit, 2007. 16$^{th}$ ISR, Jul. 1-5, 2007, pp. 1-5.

Izumikawa et al., "MAP Multiplexing in IEEE 802.16 Mobile Multi-Hop Relay," In: 17$^{th}$ Annual IEEE International Symposium on Personal, Indoor and Mobile Radio Communications (PIMRC'06), Sep. 2006, pp. 1-5.

Lin et al., "Resource scheduling with directional antennas for multi-hop relay networks in Manhattan-like environment," In: Mobile WiMAX Symposium, 2007. IEEE, Mar. 25-29, 2007, pp. 108-113.

International Search Report and Written Opinion dated Dec. 24, 2008 for PCT/US2008/069377, entitled: "Resource Allocation in Wireless Multi-Hop Relay Networks", 10 pages.

International Preliminary Report on Patentability dated Jan. 21, 2010 for International Application No. PCT/US2008/069377, filed Jul. 7, 2008 (6 pages).

International Preliminary Report on Patentability dated Sep. 3, 2009 for International Application No. PCT/US2008/054808, filed Feb. 22, 2008 (6 pages).

* cited by examiner

FRAME STRUCTURE FOR MULTI-HOP RELAY IN WIRELESS COMMUNICATION SYSTEMS

This application claims priority of U.S. Provisional Application No. 60/845,950 entitled "Frame Structure For Multi-Hop Relay In Wireless Communications Systems" and filed on Sep. 19, 2006, which is incorporated by reference as part of the specification of this application.

BACKGROUND

This application relates to wireless communication systems and techniques for wireless communications using one or more relay stations in addition to base stations.

Wireless communication systems use electromagnetic waves to communicate with fixed and mobile wireless communication devices, e.g., mobile wireless phones and laptop computers with wireless communication cards, that are located within cells of coverage areas of the systems. A radio spectral range or band designated or allocated for a wireless communication service or a particular class of wireless services may be divided into different radio carrier frequencies for generating different communication frequency channels. Such systems use base stations spatially distributed to provide radio coverage in a geographic service area which is divided into cells. In such a cellular deployment, each base station (BS) is conceptually located at the center of a respective cell to provide radio coverage for that cell and transmits information to a wireless subscriber station (SS) such as a mobile SS (MSS) via BS-generated downlink (DL) radio signals. A subscriber station at a particular cell transmits information to its serving base station for that particular cell via uplink (UL) radio signals. The base stations can include directional antennas to further divide each cell into different cell sectors where each antenna covers one sector. This sectorization of a cell increases the communication capacity.

The radio coverage of a network of fixed base stations may be limited due to various factors. Various structures may block the radio signals of certain base stations. For example, a tall building may shield a particular area from the radio signal from a base station, thus creating a undesired shadowing. At the edge of a radio cell, the signal strength can be weak and hence can increase the error rate in the wireless communications. One approach to mitigating these and other limitations is to increase the number of base stations in a given service area. In one implementation under this approach, one or more relay stations (RSs) can be deployed among certain fixed base stations to relay communication signals between a subscriber station and a base station, thus extending the coverage and improving the communication capacity and quality of the base station. A relay station may be a fixed transceiver or a mobile transceiver station depending on the specific conditions for deploying such as relation station. A subscriber station signal may hop through one or more RSs before reaching a serving base station. The proposed IEEE 802.16j provides Mobile Multi-hop Relay (MMR) modes to use relay stations for enhanced coverage and service to subscribers. A multi-hop relay wireless network under IEEE 802.16j can include MMR base stations (MMR-BSs) with the support of the MMR modes.

SUMMARY

In one aspect, a method for transmitting data control message streams among base stations, relay stations, and subscriber stations in a wireless relay communication network is described to include operating a base station to receive protocol data units for subscriber stations from networks; operating the base station to create relay protocol data units from the protocol data units based on relay station topology of one or more relay stations under control of the base station; and operating the base station to generate a transmission schedule with channel resources allocation information, in which at least one relay station is designated to receive corresponding relay protocol data units.

In another aspect, a method for receiving data and control message streams among base stations and relay stations in a wireless relay communication network is provided to include receiving relay protocol data units; decoding the received relay protocol data units into one or more of either or both of (1) subordinate relay protocol data units and (2) protocol data units; and transmitting the one or more subordinate relay protocol data units and protocol data units to at least one of (1) one or more respective relay stations and (2) one or more subscriber stations.

In another aspect, a wireless relay communication network for transmitting and receiving information among base stations, relay stations, and subscriber stations is described to include at least one base station comprising a scheduler logic to determine a communication path from the base station to each subscriber station, and a transmitter/receiver component to transmit downlink data and control messages and to receive uplink data and control messages; and at least one relay station comprising a scheduler logic to determine time duration for transmitting and receiving information, and a transmitter/receiver component to transmit data and control messages and to receive data and control messages. The base station and relay station operate to communicate with at least one subscriber station.

In yet another aspect, a method for transmitting information among base stations, relay stations, and subscriber stations in a wireless relay communication network is provided to include using a frame structure to provide a downlink relay allowing a relay station to transmit in parts of a downlink subframe of the frame structure.

These and other features are described in greater detail in the attached drawings, the detailed description and the claims.

BRIEF DESCRIPTION OF THE DRAWINGS

FIGS, 4, 5A and 5B show three examples of relay frame structures.

DETAILED DESCRIPTION

The Mobile Multi-hop Relay (MMR) modes to be defined in IEEE 802.16j need to be backward compatible with the published IEEE 802.16-2004 and IEEE 802.16e-2005 standards. It is desirable that no changes be made to an existing mobile station (MS) in order to work with a relay station (RS)

and a MMR base station (MMR-BS). Various types of relay stations, such as Fixed RS, Nomadic RS, and Mobile RS, and MMR-BSs are to be defined in the IEEE 802.16j project Task Group (TGj). According to the IEEE 802.16j Project Authorization Request (PAR), this amendment is to enhance coverage, throughput and system capacity of 802.16 networks by specifying 802.16 multihop relay capabilities and functionalities of interoperable relay stations and base stations.

The specification of this application describes, among others, implementations of systems and techniques for scheduling wireless transmission of data blocks between a base station (BS) and one or more relay stations (RSs). The scheduling can be based on one or more factors such as the quality of the transmission links between the base station and the relay stations, the amount of the data and the type of data for the relay stations to support the subscriber stations (SS's) or mobile stations (MS's) in the relay station cell coverage areas. In one aspect, the scheduling can include assigning frequency blocks and time slots to each of the relay stations for receiving or transmitting data blocks. The data blocks may include the trunk traffics for the relay station's cell and its subordinate cells if any.

In another aspect, a method for transmitting data streams between a base station and relay stations is disclosed. The method includes receiving protocol data units (PDU's) from a network for subscriber stations or mobile stations, encapsulating received PDU's to the same designated relay station, creating relay protocol data units (R-PDU's), and allocating pre-defined frequency blocks and pre-defined time slots for base station's downlink transmission. A designated relay station can be configured to decode the downlink traffic according to known schedule information. A transmission or reception schedule can include, in some implementations, channel resources allocation information for a downlink or uplink subframe.

In another aspect, the downlink schedule information is predefined and known to relay stations in the wireless system. In this configuration, a transmission or reception schedule is not transmitted from the base station to the one more relay stations.

In another aspect, downlink schedule information is produced by the base station and transmitted in the downlink subframe. For example, this schedule information can be included in a base station downlink MAP or a relay station specific downlink MAP, or a special downlink information element (IE).

In another aspect, downlink schedule information is produced by a relay station and transmitted in the downlink subframe. For example, this schedule information can be included in part of a general downlink MAP or a relay station specific downlink MAP, or a special downlink information element (IE).

In another aspect, the downlink schedule information is produced by the base station and transmitted in a different radio frequency channel from the radio frequency channel that is used to transmit the data packets and is within the same frequency band. This radio frequency channel for carrying the downlink schedule information can be a control channel with a narrow bandwidth. The downlink schedule information can also be transmitted in a different frequency band from a channel that carries the data packets. The downlink schedule information can be transmitted by using a different or the same technology for transmission of the data packets and by using a different or the same frame structure for transmission of the data packets. The downlink schedule information can be transmitted by out-of-band transmission. This schedule information is received by relay station to perform reception or transmission in a particular period of time or assigned time slots in a downlink subframe.

In another aspect, the downlink schedule information is produced by a relay station and transmitted in a different radio frequency channel from the channel for transmitting data packets to its subordinate relay station. This channel for the downlink schedule information can be via a control channel. The downlink schedule information can be transmitted by using a different or the same technology for transmission of the data packets and by using a different or the same frame structure for transmission of the data packets. The downlink schedule information can be transmitted by out-of-band transmission. This schedule information is received by the subordinate relay station to perform reception or transmission in a particular period of time or assigned time slots in a downlink subframe.

In another aspect, a method for receiving data streams at a relay station from a base station is disclosed. The method includes receiving a special protocol data unit for a relay station, Relay Protocol Data Unit (R-PDU), decoding the R-PDU into its subordinate R-PDU's and regular PDU's, and transmitting them to the designated relay stations and subscriber stations.

In another aspect, the uplink schedule information can be predefined and known to relay stations in the wireless system and thus is not transmitted.

In yet another aspect, the uplink schedule information is produced by the base station and transmitted in a downlink subframe. For example, this schedule information can be included in a base station uplink MAP or a relay station specific uplink MAP, or a special uplink information element (IE).

In yet another aspect, the uplink schedule information is produced by a relay station and transmitted in a downlink subframe. For example, this schedule information can be included in part of a uplink MAP or a relay station specific uplink MAP, or a special uplink information element (IE).

In yet another aspect, the uplink schedule information is produced by the base station and transmitted in a different radio frequency channel from the frequency channel that is used to transmit the data packets and is within the same frequency band. This radio frequency channel for carrying the uplink schedule information can be a control channel with a narrow bandwidth. The uplink schedule information can also be transmitted in a different frequency band from a channel that carries the data packets. The uplink schedule information can be transmitted by using a different or the same technology for transmission of the data packets and by using a different or the same frame structure for transmission of the data packets. The uplink schedule information can be transmitted by out-of-band transmission. This schedule information is received by relay station to perform reception or transmission in a particular period of time or assigned time slots in an uplink subframe.

In yet another aspect, the uplink schedule information is produced by a relay station and transmitted in a different radio frequency channel from the frequency channel that is used to transmit the data packets and is within the same frequency band. This radio frequency channel for carrying the uplink schedule information can be a control channel with a narrow bandwidth. The uplink schedule information can also be transmitted in a different frequency band from a channel that carries the data packets. The uplink schedule information can be transmitted by using a different or the same technology for transmission of the data packets and by using a different or the same frame structure for transmission of the data packets. The uplink schedule information can be transmitted by out-of-band transmission. This schedule information is received by the subordinate relay station in order to perform reception or transmission in a particular period of time or assigned time slots in an uplink subframe.

Other aspects of this application include implementations of techniques for transmitting downlink traffic streams via one or multiple relay stations, techniques for transmitting uplink traffic streams via one or multiple relay stations, techniques for transmitting downlink and uplink subframes with dedicated bursts allocation for relay stations, and techniques for transmitting downlink and uplink subframes with dedicated zones allocation for relay stations.

Figure 1:
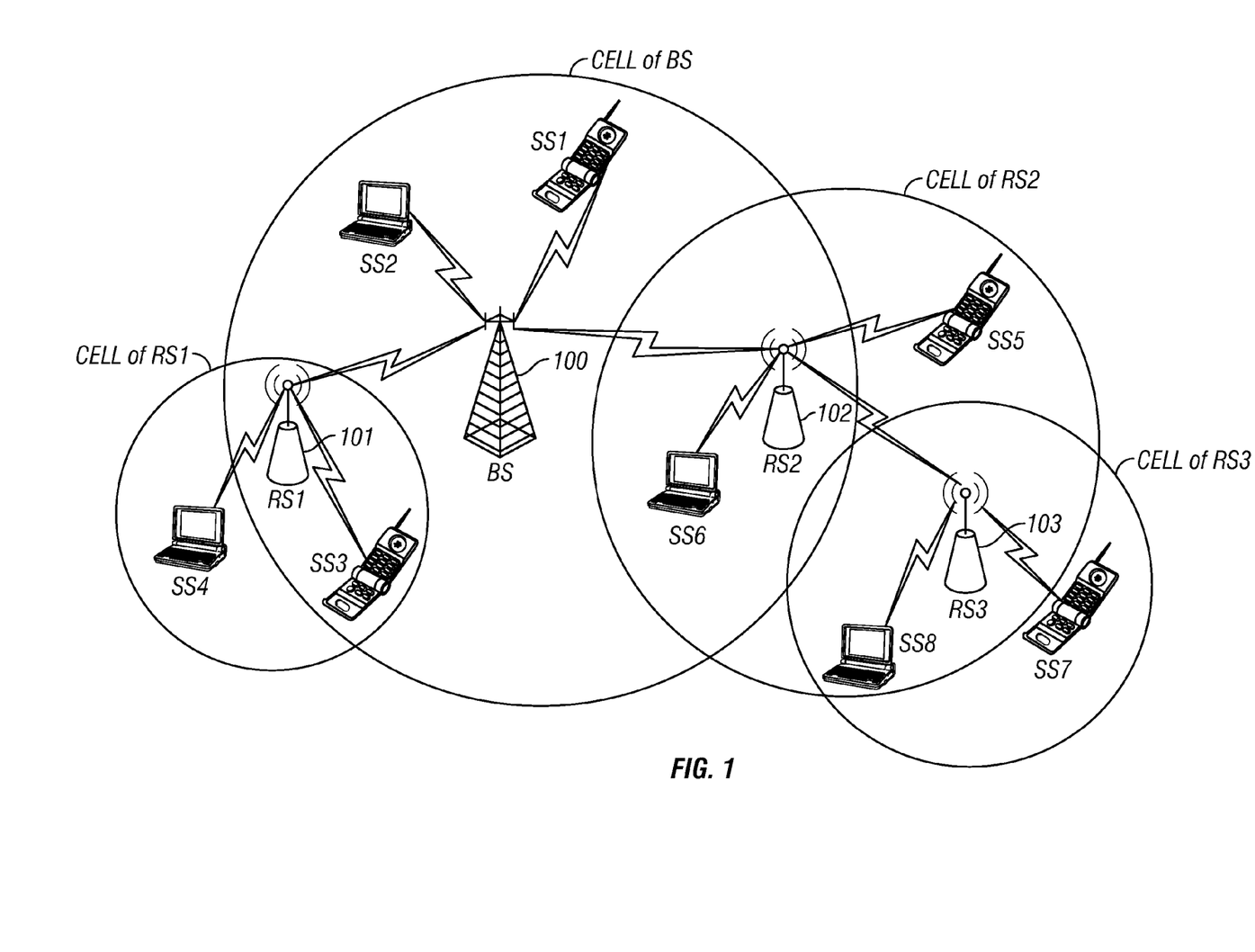
FIG. 1 shows an example of a multi-hop relay wireless network.

FIG. 1 illustrates a portion of an exemplary wireless multi-hop relay communication system that can implement a frame structure for relay stations described in this application. This system includes at least one base station (BS) 100 and multiple relay stations 101 (RS1), 102 (RS2), and 103 (RS3) to provide radio coverage for serving one or more subscriber stations (e.g., SS1 to SS8). The base station 100 can be a fixed base station and the relation stations 101, 102 and 103 can be fixed relay stations, nomadic relay stations or mobile relay stations. Such a relay station can be located on a moving vehicle, a train, a ship or boat or other moving platforms. A relay station can be located inside a building, in an area with poor radio reception such as in a shadow of a tall building or hill. As a specific example, two subscriber stations SS3 and SS4 are shown to be in a coverage area of the RS1 101.

A relay station be used to extend a coverage of a base station or a superordinate or parent relay station. Referring to the example in FIG. 1, the relay stations RS1 101, RS2 102 and RS3 103 are subordinate to the BS 100 because the BS 100 is connected to the network and is the gateway for the relay stations RS1 101, RS2 102 and RS3 103 to the rest of the network. In this context, the BS 100 is the superordinate to the relay stations RS1 101, RS2 102 and RS3 103. In addition, it is possible for relay stations RS1 101, RS2 102 and RS3 103 under the control of the superordinate BS 100 to have superordinate and subordinate relationships with one another. For example, the relay station RS3 103 is subordinate to the relay station RS2 102 because RS3 103 communicates to BS 100 through RS2 102. Hence, the relay station RS2 102 is superordinate to the relay station RS3 103. In this context, BSs and relay stations in the system in FIG. 1 can be classified into superordinate base stations and subordinate base stations based on their relative relationships. The BS 100 in FIG. 1 is the superordinate base station to all relay stations and the relay station RS2 102 is a subordinate base station to the BS 100 but a superordinate base station to the relay station RS3 103.

The base station 100 can include a scheduler logic to determine a communication path from the base station 100 to each subscriber station, and a transmitter/receiver component to transmit downlink data and control messages and to receive uplink data and control messages. Each relay station 101, 102 or 103 includes a scheduler logic to determine time duration for transmitting and receiving information, and a transmitter/receiver component to transmit data and control messages and to receive data and control messages. The base station 100 and a relay station operate to communicate with at least one subscriber station.

Figure 2:
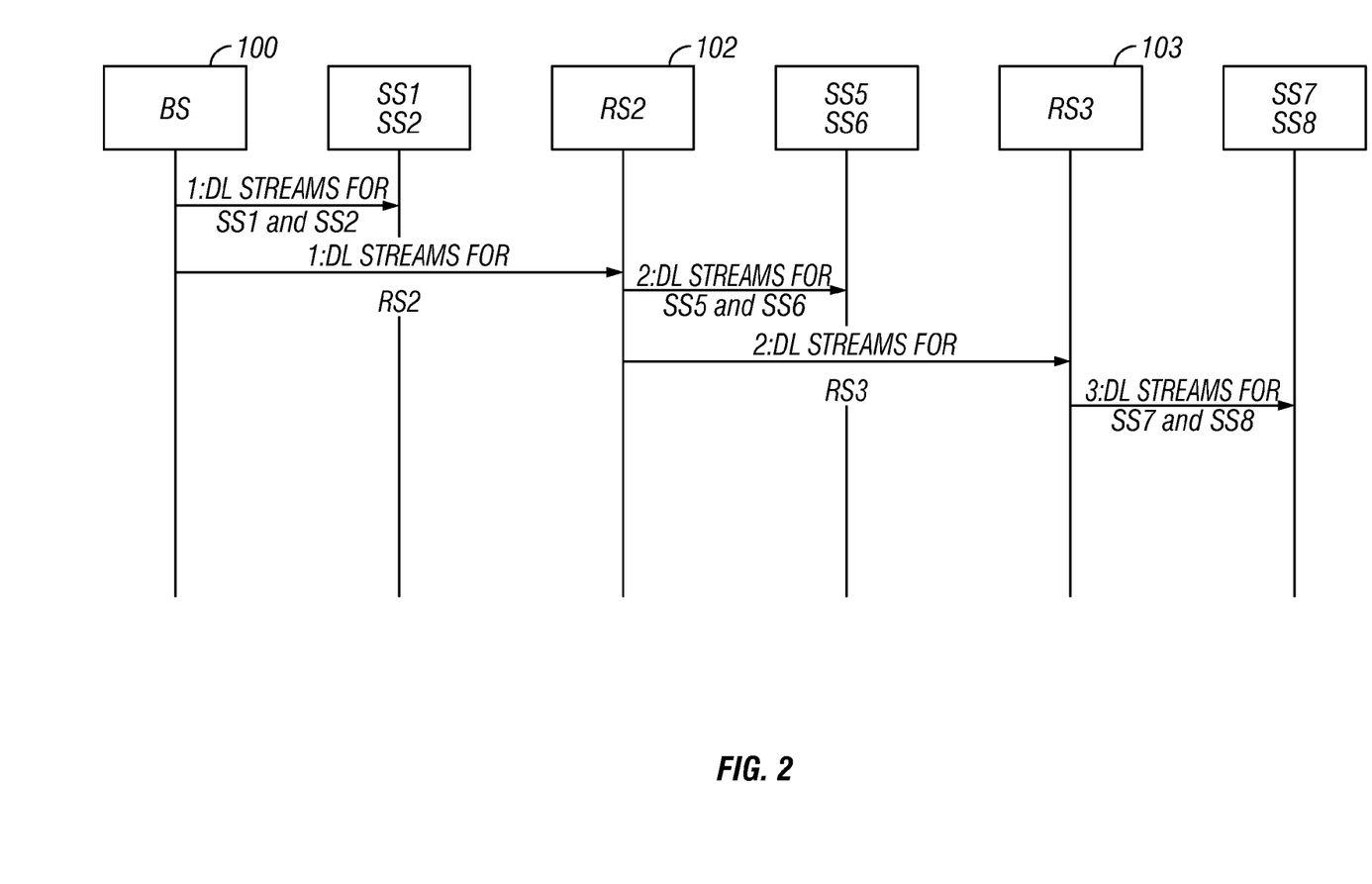
FIGS. 2 and 3 illustrate examples of communications in the network in FIG. 1.
Figure 3:
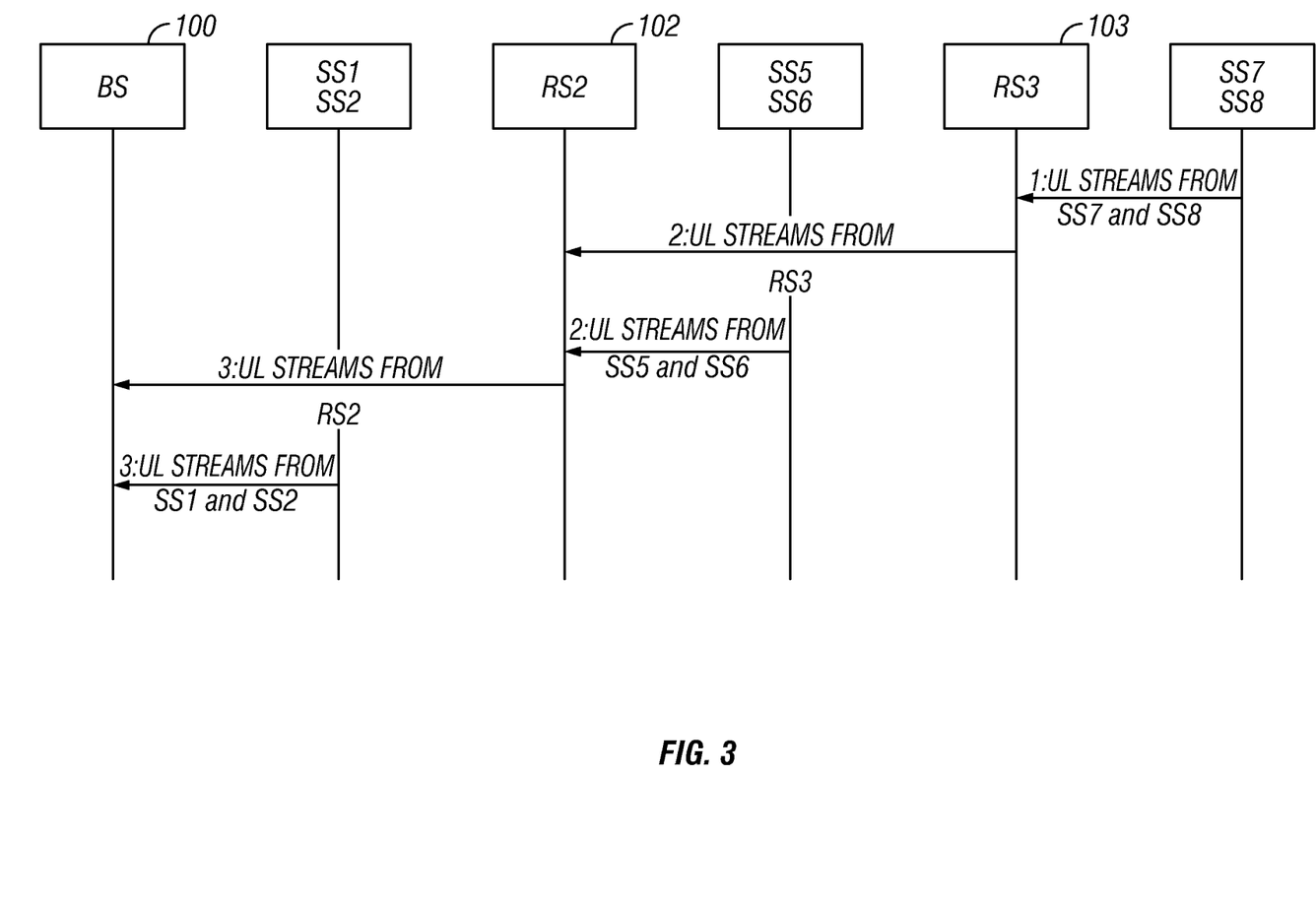

FIGS. 2 and 3 show example flow diagrams of downlink and uplink traffic streams, including data and control signals, for the wireless multi-hop relay communication system as illustrated in FIG. 1. Subscriber stations SS1 and SS2 are directly served by the base station BS 100 without hopping through any relay stations. The base station BS 100 communicates with SS5 and SS6 via RS2 102 so that DL streams are first sent from BS 100 to RS2 102 and then RS2 102 sends out DL streams for SS5 and SS6. For SS7 and SS8, the communications with BS 100 go through two hops via RS2 102 and RS3 103.

Figure 4:
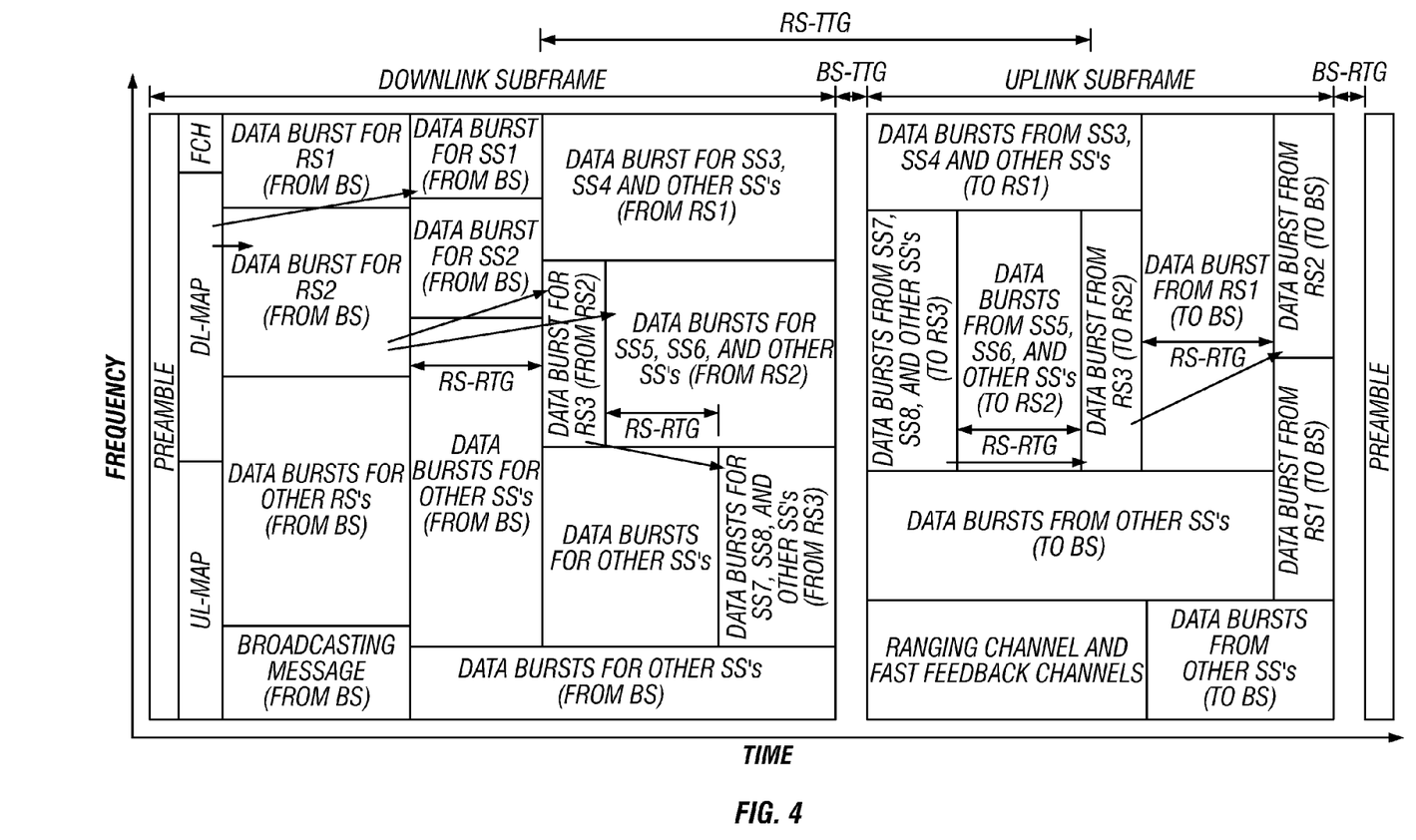

FIG. 4 illustrates an example frame structure which includes downlink and uplink subframes for the system in FIG. 1. The horizontal axis represents the time slot part of the radio resources and the vertical axis represents the frequency part of the radio resources. The downlink frame includes direct transmission from the base station BS 100 to subscriber stations and transmission from the base station BS 100 to subscriber stations via one or more relay stations. The uplink frame includes direct transmission from subscriber stations to the base station BS 100 and transmission from subscriber stations to the base station BS 100 via one or more relay stations. The downlink frame and the uplink frame are separated in time by a base station transmit-to-receive transition time (TTG). One frame may include one downlink subframe and one or more uplink subframes. After completion of the one or more uplink subframes, a time gap known as the base station receiver/transmit transition gap (RTG) is added between the one uplink subframe or the last uplink subframe and a downlink subframe of a subsequent frame.

In the frequency domain along the vertical axis in FIG. 4, different channel frequencies within a common frequency band or different channel frequencies in different frequency bands are assigned to carry various data in the system in FIG. 1. This assignment of different channel frequencies change within each subframe. In this example, the preamble of frame is first transmitted out by the BS 100 and is followed by transmission of the frame control header (FCH), the downlink map (DL-MAP) and the uplink map (UL-MAP), which are allocated in the same time lot for transmission at different channel frequencies in this example.

In the example in FIG. 4, the downlink subframe includes data bursts transmitted from the base station 100 to its relay stations, data bursts transmitted from one relay station to another relay station, and the data bursts transmitted from relay stations to the associated subscriber stations. The downlink burst allocation can be provided by the Downlink Map (DL-MAP) in IEEE 802.16 networks which describe a Medium Access Control (MAC) message that defines burst start times for both time division multiplex (TDD) and time division multiple access (TDMA) by a subscriber station on the downlink. Other downlink messages different from DL-MAP can also be used. In other implementations, the burst allocation signals can be provided by its parent base stations or relay stations. Similarly the uplink subframe can include the data bursts from subscriber stations to the designate relay stations, and the data bursts from the relay stations to the base station. The uplink burst allocation can be provided by the Uplink Map (UL-MAP) or other uplink messages. In other implementations, the burst allocation signals can be provided by its parent, superordinate base stations or superordinate relay stations.

The frequency-time allocations for the relay stations RS2 102 and RS3 103 to receive and transmit data are highlighted and the related signal transmission paths are indicated by arrowed lines. The TTG for the relay station RS2 102 is illustrated and is set to meet the minimum Transmit-to-Receive Transition Time (TTG) for each relay station. A data burst from the BS 100 to a relay station is received by the relay station. The receiving relay station decodes and removes part of the data in the received data burst directed to the receiving relay station and relays the rest of the received data burst to one or more subordinate relay stations and one or more subordinate subscriber stations. The next subordinate relay station repeats a similar operation until proper data is routed to the intended subscriber stations in the serving area of the relay station and the base station. In the uplink subframe, the reverse process is performed by the subscriber stations, the relay stations and the base station where protocol data units from subscriber stations are packaged by relay stations and are relayed to the base station which sends the protocol data units from its subscriber stations to the network.

In the frame structure in FIG. 4, the entire frame has one single preamble, one UL-MAP, one DL-MAP and one FCH to provide the transmission and receiving schedules for all relay stations and subscriber stations. The BS 100 transmits the preamble, the UL-MAP, the DL-MAP and the FCH first. In this frame design, two different relay stations may transmit data bursts at the same time.

Figure 5A:
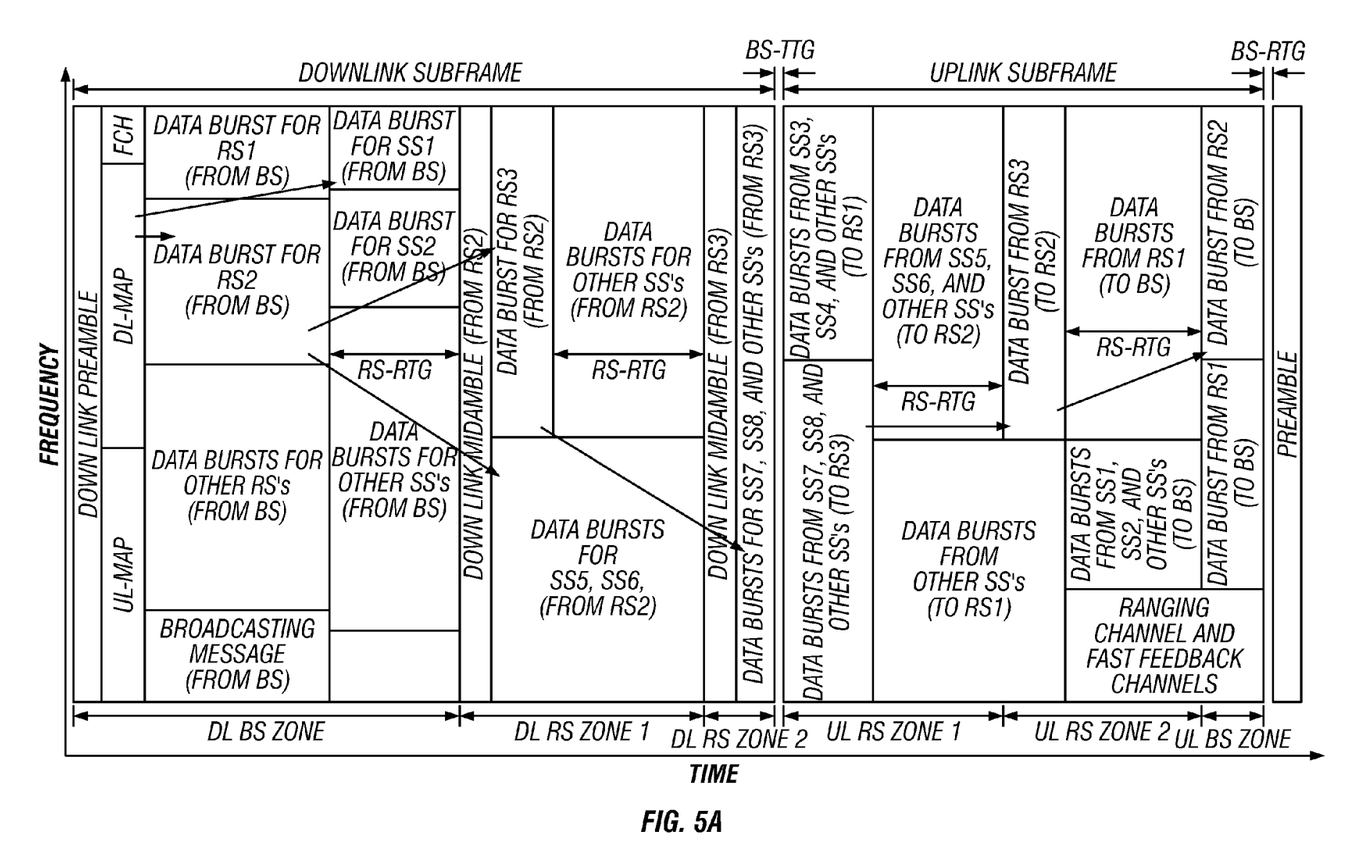
Figure 5B:
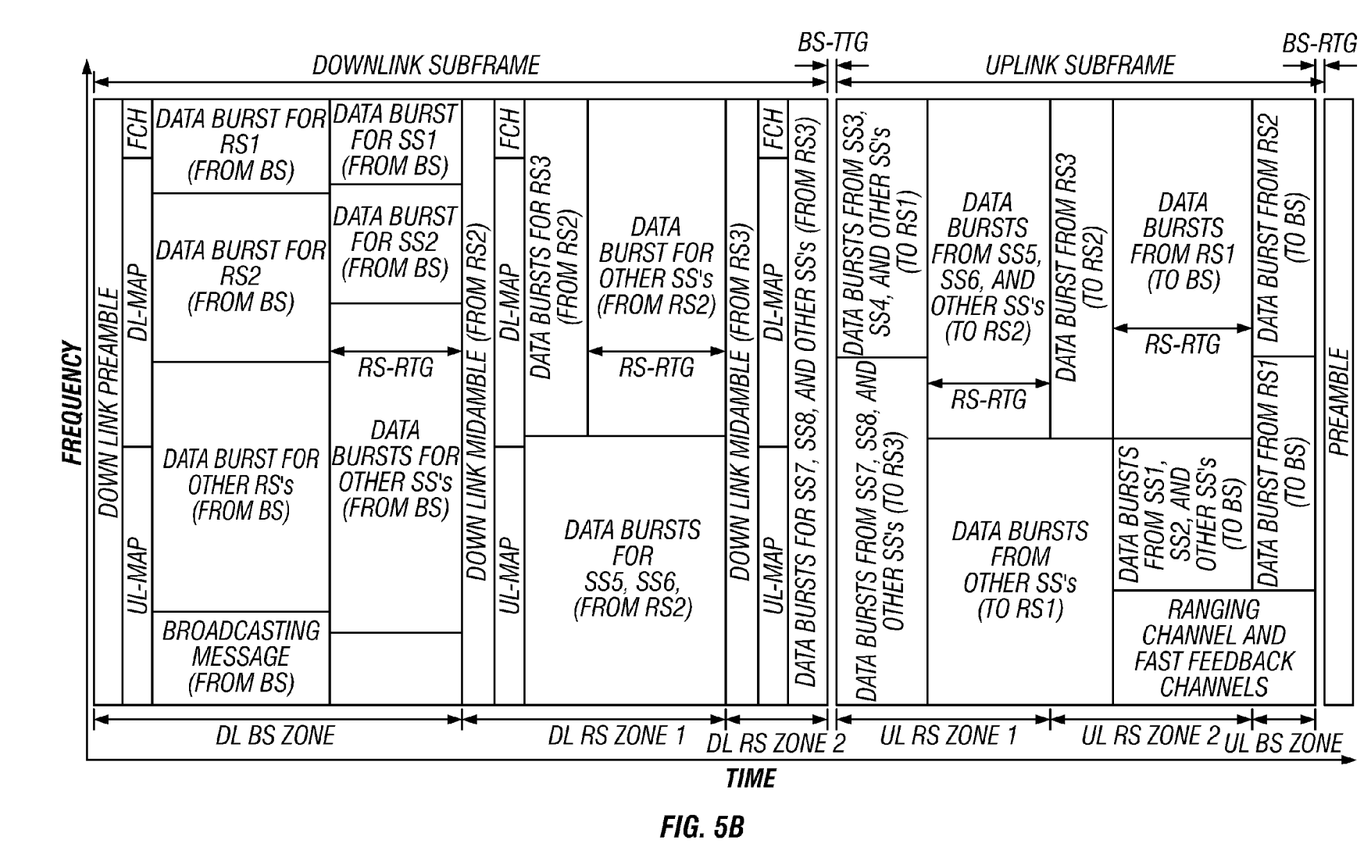

In another implementation, the time slots in the downlink subframe are divided to different time zones and each time zone is designated for the base station or one relay station to transmit data bursts only. FIGS. 5A and 5B show two examples of this frame design.

FIG. 5A illustrates an example frame structure with divided transmission time zones for the downlink subframe for hoping through relay stations. In this example, the downlink subframe includes multiple downlink transmission zones. In the DL BS Zone, data bursts are transmitted from the base station to its relay stations (RS1 and RS2) and subscriber stations (SS1 and SS2). The BS sends out the single UL-MAP, single DL-MAP and single FCH for the entire frame. In the DL RS Zone1, the data bursts are transmitted from relay station RS2 to the associated relay stations (RS3) and subscriber stations (SS5 and SS6). In the DL RS Zone 2, the data bursts transmitted from relay station RS3 to the associated subscriber stations (SS7 and SS8). Following the first zone, e.g., the DL BS Zone, each zone may optionally start with a downlink midamble symbol.

Similarly, an uplink subframe can also include multiple uplink transmission zones (UL RS Zone 1, UL RS Zone 2 and UL BS Zone) in the frame in FIG. 5A. In the UL RS Zone1, data bursts are transmitted from the subscriber stations (SS7 and SS8) to their relay stations (RS3), and data bursts are transmitted from the subscriber stations (SS3 and SS4) to their relay stations (RS1). In the UL RS Zone2, some data bursts are transmitted from relay station RS3 to the associated relay stations (RS2), and some data bursts are transmitted from relay station RS1 and other associated subscriber stations (SS1 and SS2) to base station. In the UL BS Zone, the data bursts are transmitted from relay stations (RS1 and RS2) and other subscriber stations to base station. The relay stations RS1 and RS3 are in receiving mode in UL RS Zone1, then subsequently some relays (RS1 and RS3) switch from receiving mode to transmitting mode. In UL BS Zone, all relay stations (RS1 and RS2) are in transmitting mode.

FIG. 5B illustrates another example frame structure with divided transmission time zones for the downlink subframe for hoping through relay stations. Different from the frame structure in FIG. 5A, the BS sends out its UL-MAP, DL-MAP and FCH at the beginning of its designated DL BS Zone and each relay station also sends out its UL-MAP, DL-MAP and FCH at the beginning of its designated zone.

Figure 6:
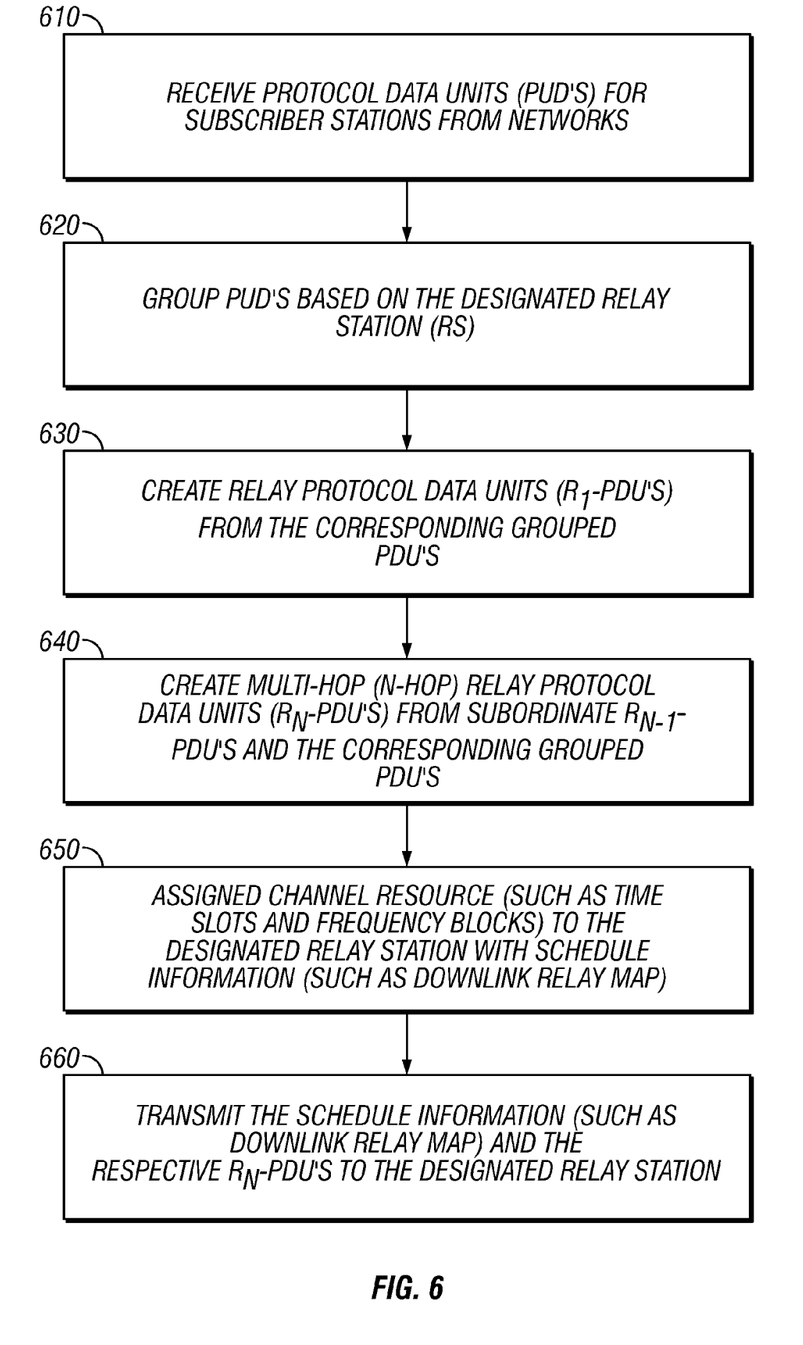
FIG. 6 shows an example flow diagram of a base station scheduler.

FIG. 6 shows an example flow diagram of a base station scheduler. In this example, a base station first groups the PDU's of a designated relay station to create a Relay Protocol Data Unit (R-PDU), then transmits the schedule information and the R-PDU to the designated relay station. As illustrated, the base station receives protocol data units (PDU's) directed to subscriber stations from the networks (Step 610). The base station groups received PDU's based on the designated relay station (Step 620). This grouping is based on the relay station topology in connection with the subordinate-superordinate relations with respect to the parent base station. The base station creates relay protocol data units (R1-PDU's) from the corresponding grouped PDU's (Step 630). Next, the base station creates multi-hop (N-Hop) relay protocol data units (Rn-PDU's) from subordinate RN-1-PDU's and the corresponding grouped PDU's (step 640). The base station then assigns channel resource, e.g., time slots and frequency blocks, to the designated relay station with schedule information such as downlink relay MAP (step 650). The base station transmits the schedule information such as downlink relay MAP and the respective RN-PDU's to the designated relay station (step 660). Referring to FIGS. 4, 5A and 5B, this transmission by the base station is performed at the beginning of the downlink subframe.

Figure 7:
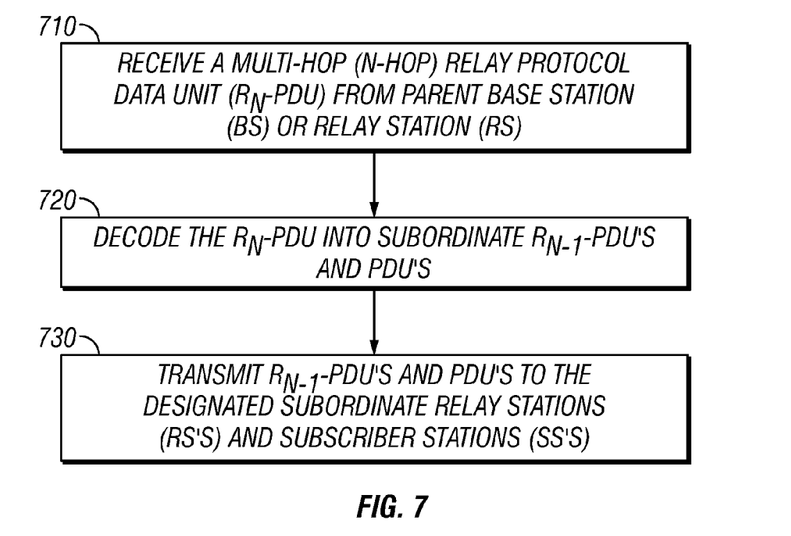
FIG. 7 shows an example operation of a relay station in decoding received data and relaying data to one or more designated subordinate relay stations and subscriber stations.

FIG. 7 shows an example for a relay station to decode a $R_N$-PDU into $R_{N-1}$-PDU's and PDU's, and then to transmit them to the designated subordinate relay stations and subscriber stations. This process is done during the downlink subframe. As illustrated, a relay station receives a multi-hop (N-Hop) relay protocol data unit (Rn-PDU) from its parent or superordinate base station (BS) or superordinate relay station (step 710). The relay station decodes the received Rn-PDU into subordinate Rn-1-PDU's and PDU's (step 720). Next in step 730, the relay station transmits Rn-1-PDU's and PDU's to the designated subordinate relay stations (RS's) and subscriber stations (SS'S).

Figure 8:
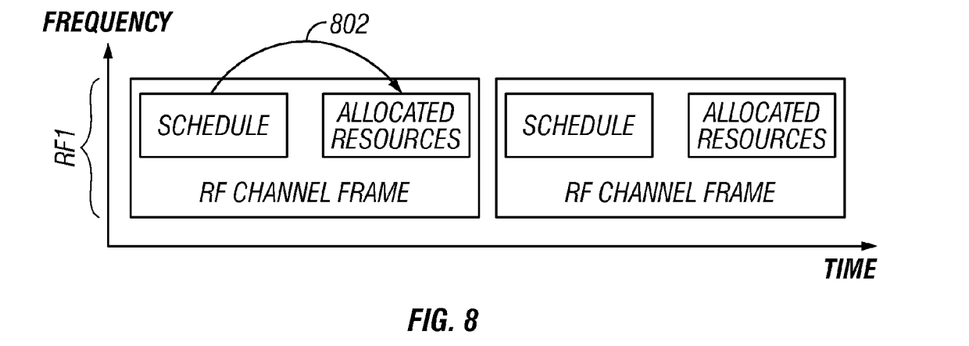
FIGS. 8, 9 and 10 illustrate three examples for providing radio resources in implementing relay frame structures described in this application.
Figure 9:
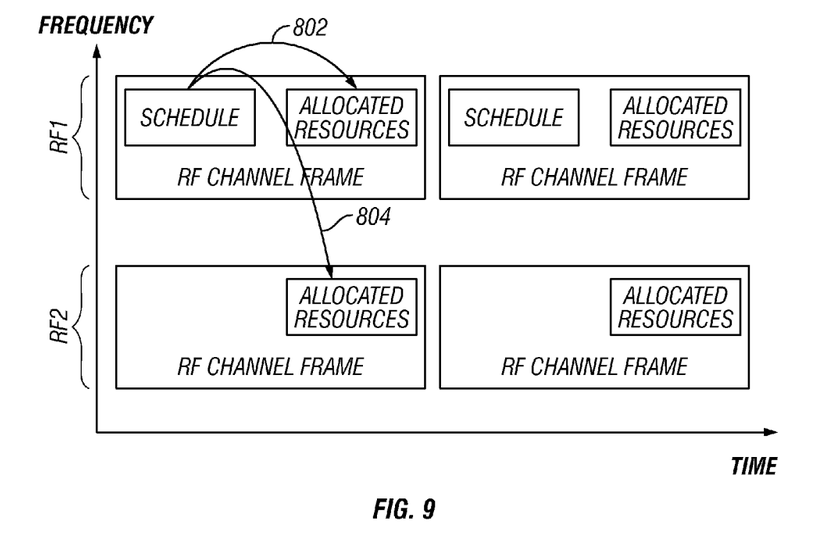
Figure 10:
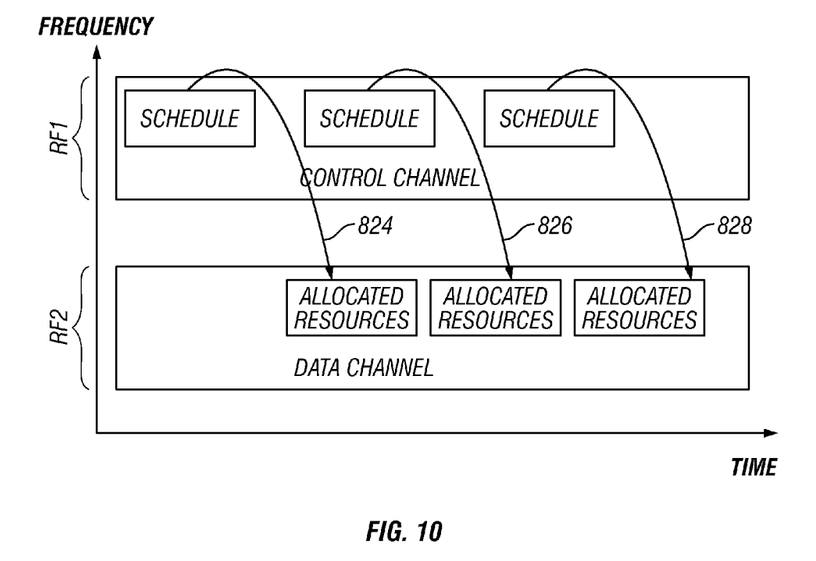

In the above described relay frame structures, the radio resource allocation can be implemented in various configurations. FIGS. 8, 9 and 10 illustrate three examples.

FIG. 8 shows that a single RF channel is used to carry out the operations in the frame structures in FIGS. 4, 5A and 5B. The given bandwidth RF1 of the RF channel is divided into different frequency blocks as shown in FIGS. 4, 5A and 5B. Two adjacent frames are shown.

FIG. 9 shows examples of how the schedule information is sent in the same frequency band by using two different channels RF1 and RF2 in the same frequency band. The schedule information can be sent together with the allocated resources in the same radio frequency (RF) channel, as indicated by 802. The schedule information can also be sent in a RF channel which is different from the RF channel of allocated resources, as indicated by 804. In this example, the second channel RF 2 is used exclusively for providing allocated resources and the first channel RF1 is used for both scheduling and providing allocated resources. The downlink schedule information can be transmitted by using a different or the same technology for transmission of the data packets and by using a different or the same frame structure for transmission of the data packets. This schedule information is received by relay station to perform reception or transmission in a particular period of time or assigned time slots in a downlink subframe.

FIG. 10 shows an example for using two different channels in two different frequency bands for transmitting the schedule information and data payload, respectively. The two channels RF1 and RF2 are in two different frequency bands. The first channel RF1 is used as a control channel to provide scheduling information for the relay stations without being used to carry data payload. This channel RF1 can be a narrowband channel with a bandwidth less than that of the channel RF2. The control channel RF1 can be a wireless channel or a wired channel or wired network connection which may be, e.g., Ethernet, and T1/E1 lines. The second channel RF 2 is used to provide allocated resources for carrying data payload. Therefore, the schedule information can be sent in a different RF channel or RF band, which is different from the RF channel of allocated resources, as indicated by 824, 826 and 828. The RF channel providing the schedule information may not have the same bandwidth as the RF channel providing the allocated resources, and they are not necessary following the same frame structure.

The implementations can be used to allow for multi-hop relay wireless communications among base stations, relay stations, and subscriber stations. Subscriber stations can include but are not limited to fixed, nomadic, and mobile stations. Relay stations can include but are not limited to fixed, nomadic, and mobile relay stations. The described techniques may be implemented on a dedicated wireless infrastructure or may be implemented as networks expansion on top of existing wireless communications systems.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments have been described. Other embodiments are within the scope of the following claims.

What is claimed is:

1. A method for transmitting data control message streams among base stations, relay stations, and subscriber stations in a wireless relay communication network, comprising:
    operating a base station to receive protocol data units for subscriber stations from a network;
    operating the base station to create relay protocol data units from the protocol data units based on a relay station topology of two or more relay stations under control of the base station, wherein operating the base station to create relay protocol data units comprises generating a first group of received protocol data units for a first relay station based on the relay station topology, generating a second, different group of received protocol data units for a second relay station based on the relay station topology, including the first group of received protocol data units into a relay protocol data unit for the first relay station, and including the second group of received protocol data units into the relay protocol data unit for the first relay station as a subordinate relay protocol data unit for the second relay station, wherein the second relay station is subordinate to the first relay station; and
    operating the base station to generate a transmission schedule with channel resources allocation information, in which at least one relay station is designated to receive corresponding created relay protocol data units; and
    causing the first relay station to receive the relay protocol data unit for the first relay station, decode the received relay protocol data unit into a decoded subordinate relay protocol data unit and one or more decoded protocol data units, transmit the one or more decoded protocol data units to one or more subscriber stations, respectively, and transmit the decoded subordinate relay protocol data unit to the second relay station to cause the second relay station to transmit one or more protocol data units to one or more one or more subscriber stations.

2. The method as in claim 1, comprising:
    transmitting the transmission schedule to one or more relay stations to cause one or more relay stations to receive the corresponding created relay protocol data units according to the transmission schedule.

3. The method as in claim 2, comprising:
    transmitting the transmission schedule to one or more relay stations together with protocol data units in a transmission frame.

4. The method as in claim 2, comprising:
    transmitting the transmission schedule to one or more relay stations together with protocol data units at a first radio frequency channel different from a second radio frequency channel for transmitting protocol data units, wherein the first and second radio frequency channels are in a frequency band.

5. The method as in claim 2, comprising:
    transmitting the transmission schedule to one or more relay stations by using a first radio frequency channel in a first frequency band; and
    transmitting the relay protocol data units to one or more relay stations by using a second, different radio frequency channel in a second, different frequency band.

6. The method as claimed in claim 5, wherein:
    the first radio frequency channel is a wired network connection.

7. The method as claimed in claim 2, comprising:
    designating a combination of one or more time slots and one or more frequency blocks; and
    operating a designated relay station to receive the corresponding created relay protocol data units according to the transmission schedule.

8. The method as claimed in claim 7, comprising:
    designating a combination of one or more time slots and one or more frequency blocks to have a Transmit-to-Receive Transition Time (TTG) for each relay station to meet a minimum time gap.

9. The method as in claim 1, further comprising:
    transmitting information to the first relay station, wherein the information comprises the relay protocol data unit for the first relay station and the transmission schedule, wherein the relay protocol data unit for the first relay station comprises one or more protocol data units for a relay station subordinate to the first relay station and one or more protocol data units for one or more respective subscriber stations.

10. The method as in claim 1,
    wherein causing the first relay station to receive the relay protocol data unit for the first relay station comprises transmitting the transmission schedule and the relay protocol data unit for the first relay station to the first relay station.

11. A wireless relay communication network for transmitting and receiving information among base stations, relay stations, and subscriber stations, comprising:
    at least one base station comprising a scheduler logic to determine a communication path from the base station to each subscriber station, and a transmitter/receiver component to transmit downlink data and control messages and to receive uplink data and control messages; and
    first and second relay stations comprising a scheduler logic to determine time duration for transmitting and receiving information, and a transmitter/receiver component to transmit data and control messages and to receive data and control messages, wherein the second relay station is subordinate to the first relay station, wherein the at least one base station is configured to receive protocol data units for subscriber stations, generate a first group of received protocol data units for the first relay station based on a relay station topology, generate a second, different group of received protocol data units for the second relay station based on the relay station topology, include the first group of received protocol data units into a relay protocol data unit for the first relay station, and include the second group of received protocol data units into the relay protocol data unit for the first relay station as a subordinate relay protocol data unit for the second relay station.

12. The network as claimed in claim 11, wherein the scheduler logic in the first relay station determines at least one of a starting moment and an ending moment in time for transmitting information.

13. The network as claimed in claim 11, wherein the scheduler logic in the at least one base station determines at least one of a starting moment and an ending moment in time for transmitting information.

* * * * *

UNITED STATES PATENT AND TRADEMARK OFFICE
CERTIFICATE OF CORRECTION

PATENT NO. : 7,873,002 B2  Page 1 of 1
APPLICATION NO. : 11/858118
DATED : January 18, 2011
INVENTOR(S) : Sean Cai It is certified that error appears in the above-identified patent and that said Letters Patent is hereby corrected as shown below:

On Page 2, item (56), under "OTHER PUBLICATIONS", in Column 1, Line 15, delete "Proceeings" and insert -- Proceedings --, therefor.

In Column 1, Line 42, delete "a undesired" and insert -- an undesired --, therefor.

In Column 4, Line 37, delete "a uplink" and insert -- an uplink --, therefor.

In Column 6, Line 44, delete "(TDD)" and insert -- (TDM) --, therefor.

In Column 10, Line 2, in Claim 1, after "units to" delete "one or more".

Signed and Sealed this
Twenty-sixth Day of April, 2011

David J. Kappos
*Director of the United States Patent and Trademark Office*